May 23, 1967   J. J. TAYLOR   3,321,569
VIBRATION DAMPER FOR TRANSMISSION LINE CONDUCTORS
Filed Nov. 6, 1964                       2 Sheets-Sheet 1

INVENTOR.
JOHN J. TAYLOR
BY
*Kenneth W. Miller*
ATTORNEY

INVENTOR.
JOHN J. TAYLOR
BY
ATTORNEY

United States Patent Office 3,321,569
Patented May 23, 1967

3,321,569
VIBRATION DAMPER FOR TRANSMISSION LINE CONDUCTORS
John J. Taylor, Medina, Ohio, assignor to The Ohio Brass Company, Mansfield, Ohio, a corporation of New Jersey
Filed Nov. 6, 1964, Ser. No. 409,444
12 Claims. (Cl. 174—42)

This invention relates to stabilizers for transmission line conductors.

A principal object of the invention is to provide a vibration damper for transmission line conductors which is effective over a substantial range of vibration frequencies and amplitudes.

Another object of the invention is to reduce the size and weight of conductor dampers in relation to the energy damping capability and frequency range thereof.

The invention will be understood more clearly from the following detailed description, taken in connection with the appended drawings in which.

Figure 1:
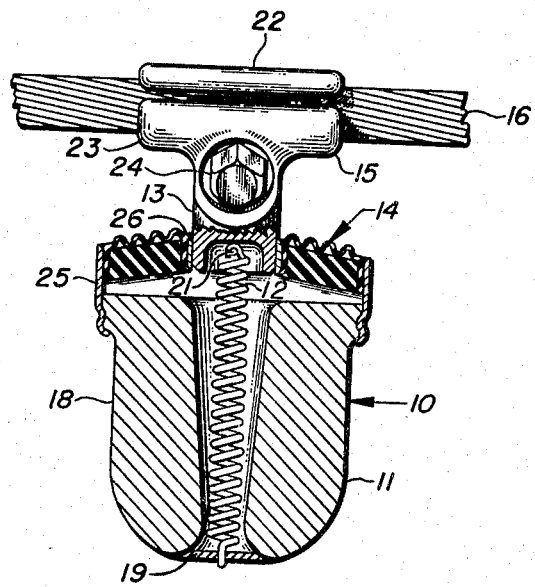
FIG. 1 illustrates one embodiment of the conductor damper of the invention and shows the relation of the damper to a transmission line conductor.

The damper 10 of FIG. 1 includes a body 11, a spring 12, a support member 13, a coupling device 14, and a conductor clamp 15 for connecting the damper 10 to a conductor cable 16 of a transmission line. The damper 10 functions to reduce or prevent vibration of the conductor cable 16 in the directions perpendicular to the cable, referred to generally as transverse vibrations, by dissipating the vibrational energy of movement of the conductor.

The body 11 functions as an inertial member for the damper 10 and comprises an elongate cylindric and annular body member 18 and a cross piece 19 secured to the body member 18 or received in transverse grooves therein for positioning the cross piece 19 and adjusting the torque of the spring 12. The cross piece 19 extends through an eye formed in the lower end of the spring.

The spring 12 is secured to the support member 13 by a pin 21 which extends through the member 13 and an eye in the upper end of the spring 12. The support member 13 has a clamp body 22 formed as an integral part thereof, and a movable clamp member 23 is secured to the member 13 by a screw fastener 24 which extends through the shank of the member 13 and through the clamp member 23.

The coupling device 14 is constituted by a cylindric metal shell 25, a second cylindric metal shell 26 arranged concentrically within the shell 25, and a flexible coupling member 27 comprising a plurality of rubber ribs 28 extending radially between the two shells. The coupling device 14 is connected to the body member 18 by the exterior shell 25 which has the lower part 29 in crimped engagement with a shoulder 30 on the upper radial extremity of the member 18. The coupling device 14 is connected to the support member 13 by the interior shell 26, which is welded, brazed, or otherwise attached to the lower extremity of the member.

The ribs 28 of the coupling member 27 are disposed at equal angles with respect to the horizontal and vertical directions of the damper 10, that is, the longitudinal central axis and the plane perpendicular to the longitudinal central axis of the body 11. The ribs are covered with a rubber sheet 31 which is suitably configured and secured to the upper edges of the ribs for flexural control thereof, as is hereinafter explained.

The damper 10 is attached to the conductor 16 on the underside thereof so that the damper extends downward from the conductor, preferably in the direction of the earth. As shown, the body 11 acts on the spring 12 and is restrained by the spring 12 and the coupling device 14 to determine an equilibrium position of the body 11 below the conductor. Accordingly, vibrating motion of the conductor 16 in the vertical direction will be imparted to the damper 10 as cyclic movement of the support member 13 relative to the body 11 and of the body 11 relative to the support member 13. The cyclic movement occurs about the equilibrium position in both vertical directions from equilibrium and along the axis centrally through the members 13 and 18, referred to hereinafter as the central or principal axis of the damper.

The coupling device 14 is so designed that a movement of the cable 16 and support member 13 relative to the body 11 dissipates energy by flexing of the ribs 28 of the coupling member 27. The ribs have a high energy dissipation or damping coefficient and may be constituted, for example, of butyl rubber.

Because of the disposition of the ribs of the coupling member 27, the relative movement of the members 13 and 18, along the principal axis in the axial mode, produces rotational movements of the member 18 about the principal axis, in either of two torsional modes. The first torsional mode occurs generally in the left hand or counterclockwise direction in advancing into the paper in FIG. 2, working the ribs in the plane of the web so that the rubber is stressed primarily in tension and compression. The second torsional mode occurs generally in the right hand or clockwise direction in advancing into the paper in FIG. 2, working the ribs perpendicular to the plane of the web so that the rubber is stressed primarily in bending and in shear. Because of the difference in properties of the rib for the two deformations, the damper has characteristic responses at widely differing frequencies for response in the two torsional modes, for example, at 5 cycles per second and 30 cycles per second in one damper embodying the invention. The energy dissipation of the damper in the low frequency mode is substantially greater than that in the high frequency mode. It is understood that the coupling device 14 does not limit the movement of the members 13 and 18 and that the coupling member 27 may execute intermediate or combined modes, between the characteristic modes above referred to, depending upon the frequency of vibration of the cable 16.

If so desired, the effect of the components of torsional movement on the conductor cable may be cancelled by two otherwise identical dampers executing oppositely directed helical movements in the same mode.

Figure 2:
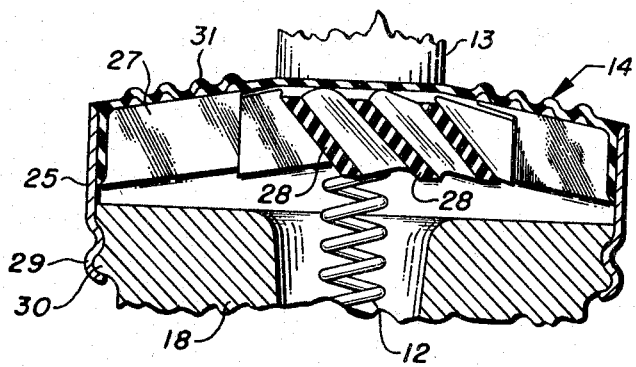
FIG. 2 is a section view of the coupler device of FIG. 1.

As shown in FIG. 2, the rib 28 comprises a web having a generally rectangular cross section with unequal longitudinal and transverse axes in the plane perpendicular to the radial axis of the rib. Generally speaking, the rib may be of symmetric cross section, e.g., circular or square, where response in a single torsional mode is desired, or asymmetric in the longitudinal and transverse axes where response in a plurality of torsional modes is desired. The separation of the modes is dependent upon the amount of asymmetry and the inclination of the rib to the principal axis of the damper.

The coupling member is constructed of a flexible resilient material having a damping coefficient sufficient to dissipate vibrational energy of the conductor without substantial deterioration of the response of the device. For example, butyl, silicone, polypropylene, and polybutadiene rubbers may be provided which are substantially critically damped. The term "rubberlike material"

as used in claims does not imply any particular damping coefficient, which is separately defined.

Figure 3:
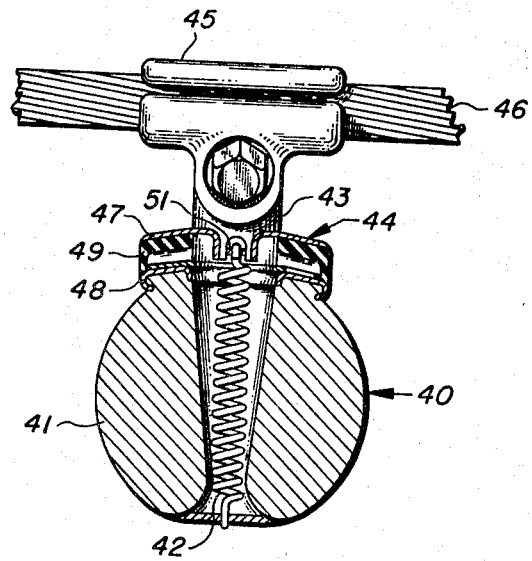
FIG. 3 illustrates another conductor damper embodying the invention.

In the embodiment of FIG. 1, in the conductor damper 10, relative movement of the body member 18 with respect to the support member 13 in simultaneous axial and torsional modes imparts a helical movement to the coupling member 27. The coaxial arrangement of the exterior and interior shells 25 and 26 serves to emphasize the response in the torsional mode relative to the response in the axial mode. In the embodiment of FIG. 3, a different arrangement is used, the helical movement of the coupling member being imparted between parallel coextending surfaces perpendicular to the principal axis of vibration, so as to emphasize the response in the axial mode relative to the response in the torsional mode.

In FIG. 3, the conductor damper 40 comprises a body 41, a spring 42, a support member 43, a coupling device 44, and a conductor clamp 45 for connecting the damper 40 to a transmission line conductor 46. The arrangement and proportioning of the parts 41, 42, 43, and 45 generally follows the same consideration heretofore set forth with respect to the apparatus of FIG. 1.

The coupling device 44 comprises radially extending coplanar discs 47 and 48 with a flexible coupling member 49 bonded to the discs on the adjacent faces thereof. The coupling device is connected to the inertia member 11 by crimped engagement of the shell 48 with a circumferentially extending shoulder 50 at the upper extremity of the member 41 and is secured to the fixed member 43 by welding or brazing the disc 47 to the member 43 at the lower extremity thereof. The spring 42 is connected to the member 43 by a stanchion and pin arrangement extending through an opening centrally of the disc 47, indicated generally at 51.

Figure 4:
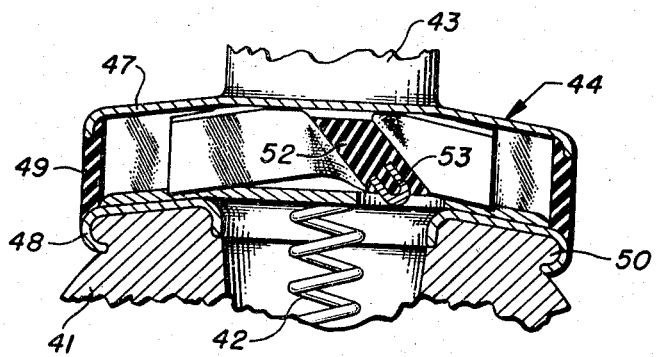
FIG. 4 is a section view of the coupler device of FIG. 3.

The flexible coupling member comprises a plurality of radially extending ribs 52 extending in the radial direction from the central axis of the members 41 and 43 radially outward to the extremities of the shells 47 and 48. As shown in FIG. 4, the rib 52 comprises a web having a generally rectangular cross section perpendicular to the radial direction of the rib, the web being inclined at an angle of approximately 45 degrees to the plane perpendicular to the central axis and generally of the planes of the discs 47 and 48. The ribs 52 are attached to the discs 47 and 48 by forming the discs into U-shaped pieces 53 which are formed in or embedded into the axial extremity of the rib. With this arrangement, the damper has two characteristic responses in a mode determined by helical movement along the longitudinal axis of the rib or by helical movement along the transverse axis of the rib in the cross section thereof, as described above for the flexible coupling member 27.

The organization of the members 13 and 18, the spring 12, and the coupling device 14 is such that the inertial member 18 may execute pendular movement with respect to the fixed member 13 due to translational movements of the conductor cable 16 along the longitudinal axis of the cable, or torsional movements about that axis, or combinations thereof. Because of the distortion of the ribs 28 or 52 in the two embodiments of the device, the vibration in the pendular modes will, in general, affect the response in the axial and torsional modes about the principal axis perpendicular to the longitudinal axis of the cable, as previously described; and the damper should be so designed that one or the other system of response modes will dominate at a predetermined frequency or over a range of frequencies.

It is to be understood that the foregoing description is not intended to restrict the scope of the invention and that various rearrangemens of the parts and modifications of the design may be resorted to. The following claims are directed to combinations of elements which embody the invention or inventions of this application.

I claim:

1. A conductor damper for stabilizing a transmission line conductor, comprising a generally tubular body member characterized by the mass thereof, spring means extending along an axis perpendicular to the line conductor and centrally through the body member, means attaching the lower end of the spring to the lower end of the body member, a support member at the upper end of the body member having the upper end of the spring means attached to the lower extremity thereof, and means for connecting the support member to the line conductor in fixed relation thereto, and a coupling device connected between the support member adjacent the lower extremity thereof and to the body member adjacent the upper end thereof for dissipating energy of relative movement between the members, and comprising a plurality of elastically deformable members extending generally radially between the support member and the outward extremity of the body member, the radial members being formed of flexible resilient material having a substantial damping coefficient, all for dissipating vibrations of the line conductor over a wide range of frequencies thereof.

2. A conductor damper for stabilizing a transmission line conductor, comprising a support member, means for connecting the support member to the transmission line conductor in fixed relation thereto, the support member being directed away from the conductor and defining a central axis generally perpendicular to the conductor, an elongate spring attached to the said support member extending along the said axis away from the conductor and the support member, an elongate annular body member characterized by the mass thereof arranged coaxially about the spring, means securing the lower extremity of the spring to the lower extremity of the body member, the spring carrying the body member from the support member and the tension of the spring and the mass of the body member defining an equilibrium position of the spring and body member when at rest and a characteristic vibration frequency thereof when in motion, and coupling means connected to the support member adjacent the lower extremity thereof and the body member adjacent the upper extremity thereof for dissipating energy of relative movement between the members induced by vibrations of the line conductor, and comprising a body of rubberlike material having a substantial damping coefficient for elastic deformation thereof upon relative movement of the said two members, all for damping vibrations of the line conductor over a wide range of frequencies about the characteristic frequency.

3. A conductor damper in accordance with claim 2, in which the coupling means comprises two spaced substantially parallel metal discs arranged generally perpendicular to the said central axis and attached to the support member and body member respectively, and the body of rubberlike material bonded to the metal discs at the adjacent faces thereof.

4. A conductor damper in accordance with claim 2, in which the body of rubberlike material is formed as radially extending ribs spaced apart in the circumferential direction thereof.

5. A conductor damper in accordance with claim 4, in which the radially extending ribs are skewed along the central axis, being inclined at substantially equal angles with respect to the said two discs.

6. A conductor damper in accordance with claim 5, in which the ribs are of generally rectangular cross section for determining a plurality of modes of response in directions perpendicular to the plane of said ribs and in the plane of said ribs according to the frequency of vibration of the line conductor.

7. A conductor damper in accordance with claim 2, in which the coupling means comprises two spaced metal parts substantially coaxial along the central axis attached to the support member and to the body member at the upper extremity thereof, and the body of rubberlike material bonded to the said coaxial parts along the adjacent faces thereof.

8. A conductor damper in accordance with claim 2, in which the body member is disposed below the support member for pendular movement with respect to said perpendicular axis.

9. A conductor damper for stabilizing a transmission line conductor, comprising a support member, means for connecting the support member to the transmission line conductor in fixed relation thereto, the said support member defining a central axis directed from the conductor generally perpendicular to the conductor, an elongate spring attached to the said support member and extending along the said axis away from the conductor, an elongate annular body member arranged with the central axis thereof along the said first-named axis and coaxially about the spring, means securing the lower extremity of the spring to the lower extremity of the body member, the spring carrying the body member from the support member and the tension of the spring and the mass of the body member defining an equilibrium position of the spring and body member when at rest and a characteristic vibration frequency thereof when in motion, and coupling means between the support and body members for dissipating energy of relative movement between the members comprising radial ribs of flexible rubberlike material having a high damping coefficient connected to the support member and body member for elastic deformation thereof upon relative movement of the said two members, and the said ribs being skewed along the said central axis for determining a plurality of characteristic vibration modes of the body member with respect to the support member by coupling axial and rotational movements along and about the said central axis due to transverse vibrations of the line conductor.

10. A conductor damper in accordance with claim 9, in which the coupling member comprises radially extending ribs of generally rectangular cross section substantially equiangularly related to the first-named axis and the perpendicular plane thereof, for response throughout a frequency range including the frequencies of the said characteristic modes.

11. A conductor damper for stabilizing a transmission line conductor, comprising a support member, means for connecting the support member to the transmission line conductor in fixed relation thereto, the said support member defining a central axis directed from the conductor generally perpendicular to the conductor, an elongate spring attached to the support member and extending along the said axis away from the conductor, an elongate annular body member characterized by the mass thereof arranged coaxially about the spring with the central axis of the body member along the said axis, means securing the lower extremity of the spring to the lower extremity of the body member, the spring carrying the body member from the support member and the tension of the spring and the mass of the body member defining an equilibrium position of the spring and body member when at rest and a characteristic vibration frequency thereof when in motion, and coupling means connected between the support and body members for dissipating energy of relative movement between the said members, comprising radial ribs of rubberlike material having a substantial damping coefficient for elastic deformation thereof upon relative movement of the said members.

12. A conductor damper in accordance with claim 11, in which the coupling device has preferred responses skewing the body member torsionally about the said perpendicular axis upon displacement from the equilibrium position.

References Cited by the Examiner

UNITED STATES PATENTS

| | | |
|---|---|---|
| 2,335,834 | 11/1943 | Wood. |
| 2,678,796 | 5/1954 | Roy _____ 248—18 X |

FOREIGN PATENTS

| | | |
|---|---|---|
| 525,536 | 5/1956 | Canada. |
| 597,655 | 5/1934 | Germany. |
| 607,077 | 12/1934 | Germany. |

LARAMIE E. ASKIN, *Primary Examiner.*

J. F. RUGGIERO, *Assistant Examiner.*